United States Patent [19]
Kundermann

[11] Patent Number: 6,016,894
[45] Date of Patent: Jan. 25, 2000

[54] HYDRODYNAMIC COUPLING DEVICE WITH A LOCKUP CLUTCH

[75] Inventor: Wolfgang Kundermann, Schweinfurt, Germany

[73] Assignee: Mannesmann Sachs AG, Schweinfurt, Germany

[21] Appl. No.: 09/244,793

[22] Filed: Feb. 5, 1999

[30] Foreign Application Priority Data

Feb. 6, 1998 [DE] Germany ............................ 198 04 634
Jun. 27, 1998 [DE] Germany ............................ 198 28 709

[51] Int. Cl.[7] ................................ F16H 45/02; F16D 3/66
[52] U.S. Cl. ........................ 192/3.3; 192/55.61; 192/57; 192/213.1; 464/64; 464/67
[58] Field of Search ..................................... 192/3.3, 3.29, 192/57, 58.2, 55.61, 213.1, 213.2, 212; 464/64, 67

[56] References Cited

U.S. PATENT DOCUMENTS

| | | | |
|---|---|---|---|
| 4,049,093 | 9/1977 | Vukovich et al. ....................... | 192/3.3 |
| 4,138,003 | 2/1979 | Malloy .................................... | 192/3.29 |
| 5,004,082 | 4/1991 | Sakakibara et al. ................... | 192/57 X |
| 5,377,796 | 1/1995 | Friedmann et al. ................... | 192/3.29 |

FOREIGN PATENT DOCUMENTS

| | | | |
|---|---|---|---|
| 28 10 497 | 10/1978 | Germany ........................ | F16H 45/02 |
| 44 33 256 | 5/1995 | Germany ........................ | F16H 45/02 |

*Primary Examiner*—Rodney H. Bonck
*Attorney, Agent, or Firm*—Cohen, Pontani, Lieberman & Pavane

[57] ABSTRACT

A hydrodynamic coupling device includes an impeller wheel with an impeller shell and a vane arrangement and a turbine wheel with a turbine shell and vane arrangement. The vane arrangements of the impeller wheel and the turbine wheel form a hydrodynamic circuit. A lockup clutch is constructed with an axially movable piston for transmitting torque by the application of pressure in the direction of a primary flange of a clutch housing via at least one friction facing provided axially between the piston and the primary flange. The lockup clutch has a torsional vibration damper with a drive-side transmission element and a driven-side transmission element which is movable relative to the latter, each of which is provided with driving means for elastic elements. The torsional vibration damper has a damping device that penetrates axially, at least along part of its axial extension, into an annular space that is enclosed by the turbine wheel and at least partially enclosed by the impeller wheel such that the damping device is arranged radially inside of the hydrodynamic circuit. The annular space is formed by an axial bulge of a radial lengthening of the turbine shell. The radial lengthening projects radially inward up to the turbine hub. The axial bulge approaches the side of the clutch housing remote of a drive up to the width of a gap, and this gap has a width which is sufficient to ensure that the turbine wheel can move relative to the clutch housing without contact.

36 Claims, 6 Drawing Sheets

HYDRODYNAMIC COUPLING DEVICE WITH A LOCKUP CLUTCH

BACKGROUND OF THE INVENTION

1. Field of the Invention

The invention is directed to a hydrodynamic coupling device with a hydrodynamic circuit having an impeller wheel and a turbine wheel, a lockup clutch, and a torsional vibration damper with a drive-side transmission element and a driven-side transmission element which is movable relative to the latter, each of the transmission elements having driving means for interacting with circumferentially acting elastic elements.

2. Description of the Related Art

A prior art hydrodynamic coupling device in the form of a torque converter is disclosed in German reference DE 44 33 256 A1, particularly in FIG. 1, with a hydrodynamic circuit having an impeller wheel, a turbine wheel and a stator wheel. This coupling device further includes a lockup clutch having an axially movable piston and a torsional vibration damper. The piston is movable in the direction of a primary flange of the clutch housing by an overpressure in the hydrodynamic circuit, wherein a plate or blade is provided axially between the piston and the primary flange. This type of blade usually has, at both sides, friction facings which engage with friction surfaces at the piston and at the primary flange as soon as the piston loads the friction facing which faces it with axial force. Torque which is present at the clutch housing is then transferred via the blade to the piston.

A radially outer part of the blade engages elastic elements of a damping device of the torsional vibration damper which are constructed as circumferential springs, wherein the elastic elements are supported at the other end at a cover plate which projects inward far enough to enable a fastening to the turbine hub. In this torsional vibration damper, the blade acts as a drive-side transmission element with drive-side driving means for the elastic elements and the cover plate acts as a driven-side transmission element with driven-side driving means.

In the hydrodynamic couplings device according to the above-cited application, the hydrodynamic circuit, torsional vibration damper and piston are arranged axially adjacent to one another, resulting in a relatively large axial installation space requirement. This hydrodynamic coupling device can accordingly be installed, if at all, only with great difficulty, especially in compact automobiles.

In another prior art hydrodynamic coupling device disclosed in the German Offenlegungsschrift 28 10 497, the hydrodynamic device and the piston of a lockup clutch are arranged axially adjacent to one another, but the torsional vibration damper is shifted far inward radially to engage radially inside the turbine wheel in an annular space enclosed by the turbine wheel.

Although axial installation space is saved compared to the hydrodynamic coupling device of reference DE 44 33 256 A1 discussed above, the torsional vibration damper is not completely integrated in the annular space and accordingly still involves a loss of axial installation space. Further, the torsional vibration damper of this prior art device is arranged so far radially inward that only a comparatively small spring path in the circumferential direction is possible.

SUMMARY OF THE INVENTION

An object of the invention to develop a hydrodynamic coupling device with a lockup clutch having a torsional vibration damper such that the axial installation space requirement is minimized.

This object is met according to the invention by a hydrodynamic coupling device including an impeller wheel rotatably mounted about an axis of rotation and a turbine wheel rotatably mounted for rotation relative to the impeller wheel about the axis of rotation. The impeller wheel has an impeller shell and an impeller vane arrangement connected with the impeller shell and the turbine wheel has a turbine shell and a turbine vane arrangement in hydrodynamic communication with the impeller vane arrangement and connected to the turbine shell. The impeller vane arrangement and the turbine vane arrangement form a hydrodynamic circuit. The hydrodynamic coupling device also includes a lockup clutch including a clutch housing and an axially movable piston. The clutch housing has a radially extending primary flange and the impeller shell. A radially outer portion of the primary flange is connected to the impeller shell and the turbine wheel is arranged axially between the impeller wheel and the primary flange. A friction facing of the lockup clutch is operatively arranged axially between the piston and the primary flange for transmitting torque between the piston and primary flange in response to pressure on the piston directed toward the primary flange. A torsional vibration damper of the hydrodynamic device includes a primary damping device having a drive-side transmission element rotatably mounted for rotation about the axis of rotation, a driven-side transmission element rotatable relative to the first drive-side transmission element, and a circumferentially acting elastic element held elastically between a drive-side driving means on the drive-side transmission element and a driven-side driving means on the driven-side transmission element. A radial lengthening of the turbine shell extending radially inward to a turbine wheel hub has an axial bulge forming an annular space enclosed by the turbine wheel and at least partially enclosed by the impeller wheel. The primary damping device axially penetrates the axial bulge so that the primary damping device is arranged radially inside of the hydrodynamic circuit. The impeller shell further comprises an impeller wheel extension radially extending from the impeller wheel to an impeller wheel hub. The axial bulge is operatively arranged for having an axial gap between the axial bulge and the impeller wheel extension, thereby allowing axial movement of the turbine wheel relative to the clutch housing.

It will be briefly noted first that a hydrodynamic coupling device may be a torque converter as well as a hydro-coupling, wherein, as is well known, the latter differs from the torque converter in that the stator wheel and therefore the positive characteristic of torque multiplication possessed by the latter are dispensed with. This fundamental disadvantage of a hydro-coupling is offset by its advantage of compact axial construction, so that the hydro-coupling may be advantageous compared to the torque converter for the present application which is particularly concerned with a compact axial construction. The unfavorable efficiency of a hydro-coupling compared with a torque converter may be compensated for in that the hydro-coupling is used only at particularly critical operating phases of the vehicle in which it is installed such, for example, as starting up or switching. The lockup clutch remains closed in all other operating states, so that in that vast majority of different operating states the hydrodynamic coupling device is operated as a friction clutch, for which reason considerable value is set on a high torque transmission capability and on excellent damping characteristics of the torsional vibration damper. According to the invention, these functional demands should be accompanied by a compact construction of the entire hydrodynamic coupling device.

In accordance with the claims, the solution to this problem lies in a radially nested construction of the hydrodynamic circuit and torsional vibration damper. The damping device of the torsional vibration damper according to an embodiment of the invention penetrates axially, at least along part of its axial extension, into an annular space that is completely enclosed by the turbine wheel and at least partially enclosed by the impeller wheel. In this way, two advantages are achieved simultaneously. The first advantage is that the arrangement of the hydrodynamic circuit on the radial outside provides for high efficiency of the same in operating states in which it is active and the second advantage is that the damping device of the torsional vibration damper does not require for itself any additional axial installation space. To maintain a sufficiently large radius of the damping device relative to the center axis of the clutch housing and accordingly to achieve a comparatively large spring path, the turbine shell is connected at the turbine hub via a radial lengthening. Another positive by-product of this measure is that sufficient installation space remains in the radial area of the radial lengthening of the turbine hub, which is radially inside of the damping device of the torsional vibration damper, for a curved out portion in the primary flange of the clutch housing directed away from the drive. The curved out portion receives fastening means used for connecting the clutch housing to a drive such as, for example, the crankshaft of an internal combustion engine.

A further measure for achieving a sufficient spring path in the region of the damping device includes two cover plates which are fixedly connected with one another. One of the two cover plates has an axial portion whose radial inner side is a guide path for spring cups and sliding shoes which are preferably made of plastic. The spring cups and sliding shoes receive the ends of the elastic elements which are preferably springs extending in the circumferential direction. Drive-side driving means are provided at the cover plates for driving the spring cups, while the elastic elements are supported at the other end at driven-side driving means connected with the turbine hub. The drive-side driving means mentioned above are on the drive side with respect to the damping device described thus far, but, when connected in series with an additional damping device, may also act as driven-side driving means for the additional damping device. In each of the damping devices, at least one radially extending lengthening acts as drive-side driving means. The lengthening may be used as a blade holder in a lockup clutch with blades arranged axially between the piston and a primary flange of the clutch housing, but may also be used as a piston holder in the absence of such blades. The blade holder is connected with the blade so as to be fixed with respect to rotation but axially displaceable relative thereto by a toothing of the blade holder. The piston holder is connected with the piston so as to be fixed with respect to rotation but axially displaceable relative thereto by means of a toothing of the piston holder.

The blade holder or the piston holder is drawn radially outward so that the friction facings may also be constructed far to the radially outer side. This ensures transmission of high torques by the lockup clutch which is particularly important when the hydrodynamic circuit is provided only for the determined operating states mentioned above.

With respect to the radial lengthening for connecting the turbine shell with the turbine hub, this turbine shell is preferably axially lengthened far enough toward the transmission side of the clutch housing so that ideally, it approaches to within a gap of the impeller wheel side of the clutch housing. The gap should have a sufficient width to prevent unwanted contact between the clutch housing and the radial lengthening even when inflation of the clutch housing occurs as a result of centrifugal force during operation.

A radially inner end of one of the two cover plates of the damping device of the torsional vibration damper is arranged axially between a radial projection of the turbine hub and the driven-side driving means of the damping device. Since the turbine hub and the driven-side driving means are held together with the radial lengthening by riveting, the axial position of the driven-side driving means of the damping device and the axial position of the other cover plate and therefore of the entire damping device, is ensured. It is only necessary to provide for a rotatable arrangement of the second cover plate in this axially secured arrangement, so that the torsional vibration damper can take effect.

In another embodiment of the clutch housing, axial indentations and/or radial indentations are provided at specified locations to provide projections at the back of the respective locations for fastening a sealing plate. The areas of extension, considered in the circumferential direction, between each two of these axial or radial indentations accordingly form channels which preferably extend radially outward and transport hydraulic fluid into a chamber situated axially between the piston and the primary flange. The chamber must be acted upon by pressure for driving the piston. Another advantageous function of the radial indentations in the area of extension of a bearing journal of the clutch housing is that one end of the driven shaft of the hydrodynamic coupling device is supported via a sealing plate.

In yet another embodiment of the torsional vibration damper, the blade holder associated with the lockup clutch is connected with the turbine shell and the latter is used as a drive-side transmission element for the torsional vibration damper. In this embodiment, the turbine hub acts as a driven-side transmission element. In a torsional vibration damper of this kind, known in technical circles as "turbine damper", the elastic elements of the torsional vibration damper act in a series connection with the driven shaft whose elasticity is conditional upon torque. However, since the stiffness of the elastic elements is much less than that of the driven shaft, there results an overall stiffness in which the driven shaft is considered very soft. This results in improved decoupling or disengagement.

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
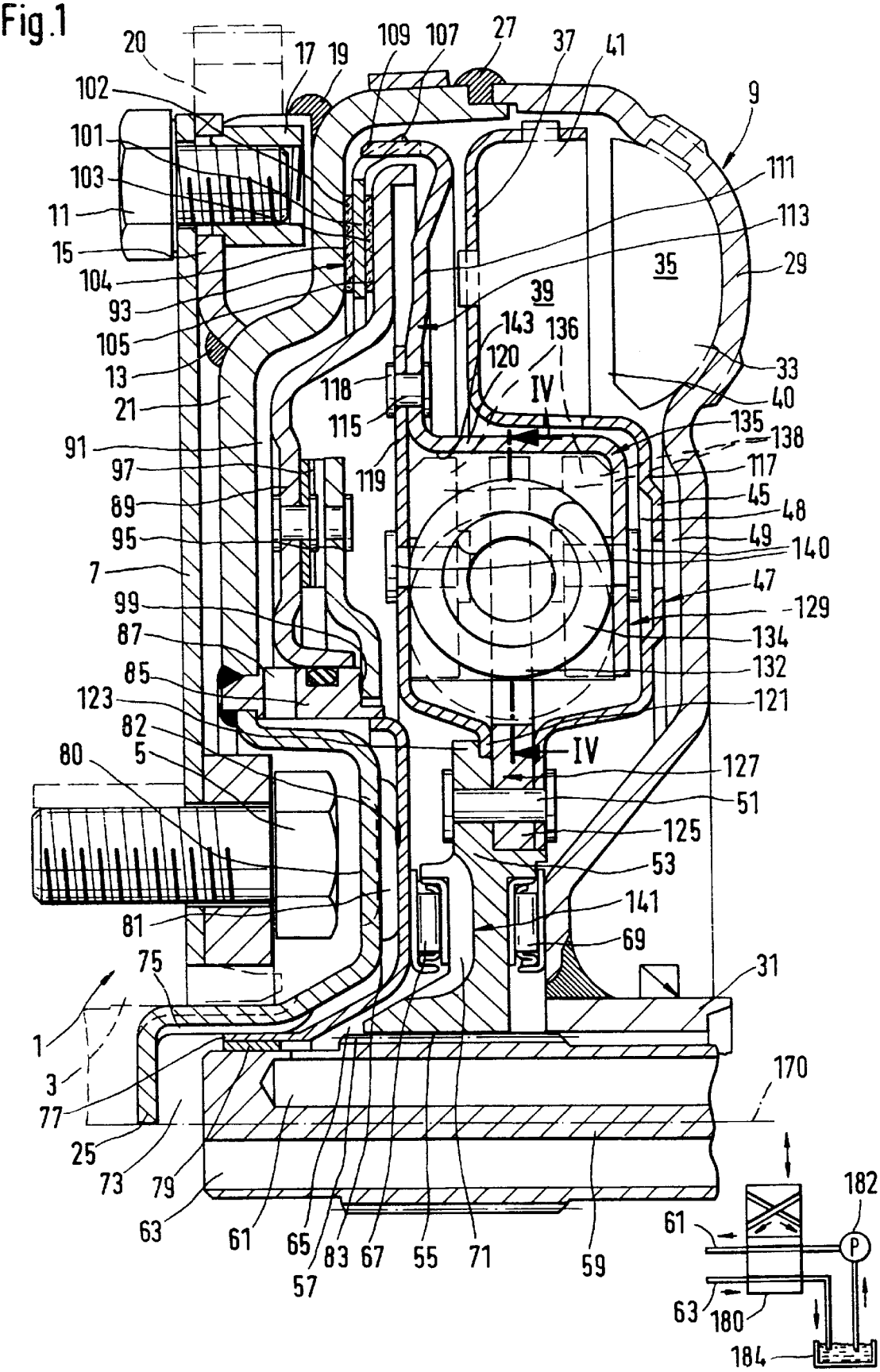
FIG. 1 shows a hydrodynamic coupling device according to an embodiment of the present invention with a lockup clutch having a torsional vibration damper, wherein a blade holder is associated with a damping device.

Referring to FIG. 1, a first embodiment of a hydrodynamic coupling device includes an axially flexible plate 7 connected to a clutch housing 9. The plate 7 is fastenable to a drive 1 shown in dashed lines in FIG. 1 such, for example, as an internal combustion engine with a crankshaft 3 by fastening elements 5 in the form of screws which are screwed into threaded bore holes of the crankshaft 3. For connection of the hydrodynamic coupling device to the crankshaft 3, an annular holder 15 is fastened by a weld 13 at a primary flange 21 of the clutch housing 9. The annular holder 15 projects in the direction of the flexible plate 7 and fixedly receives blocks 17. These blocks 17 are fastened, in turn, to the primary flange 21 via a weld 19 and having threaded bore holes for receiving connection means 11. The clutch housing 9 is fastened to the flexible plate 7 via these connection means 11. The annular holder 15, preferably together with the blocks 17, receives a toothed rim 20 so that a starter pinion, not shown, can engage with the latter.

The radially inner end of the primary flange 21 has a bearing journal 25 that is inserted into a corresponding recess of the crankshaft 3. This bearing journal 25 continues radially outward into an axial curved out portion 80 which is shaped toward the transmission side and offers the necessary free space for the above-mentioned fastening elements 5 without a loss of axial installation space. A radially outer circumferential area of the primary flange 21 is connected, via a weld 27, to an impeller shell 29. The radially inner end of the impeller shell 29 is fixedly connected with a housing hub 31. A vane arrangement 35 is connected to the impeller shell 29 to term an impeller wheel 33. A turbine wheel 41 has a turbine shell 37 and a vane arrangement 39 and axially adjoins the impeller wheel 33 for cooperating with the impeller wheel 33. A hydrodynamic circuit 40 is formed by the impeller wheel 33 together with the turbine wheel 41 in the area of the vane arrangements 35, 39.

The turbine shell 37 extends radially inward and therefore forms a radial lengthening 47 which is formed radially inside of the hydrodynamic circuit 40 as an axial bulge 45. This axial bulge 45 encloses all annular space 48 radially inside of the hydrodynamic circuit 40 and extends axially toward the impeller shell 29 up to the width of a gap 49. The gap 49 is dimensioned such that there is no frictional contact between the radial lengthening 47 and the impeller shell 29 and so that frictional contact is prevented in the event of inflation of the structural component parts of the coupling device caused by centrifugal force. A damping device 135 of a torsional vibration damper 129 is disposed in the annular space 48 formed by the axial bulge 45 which will be discussed thoroughly hereinafter.

The radially inner end of the radial lengthening 47 of the turbine shell 37 is fastened by riveting 51 to a turbine hub 53 which is axially fixed between axial bearings 67 and 69. The turbine hub includes a turbine toothing 55 at its radially inner end by which it engages with a shaft toothing 57 of a driven shaft 59. This driven shaft 59 is a transmission input shaft. The driven shaft 59 is constructed with axially extending channels 61, 63, both of which are connected to a hydro-pump 182 which is switchable by a valve 180 and which communicates with a supply 184 for hydraulic fluid. Hydraulic fluid can be admitted to one of the two channels 61 and 63, as desired, by the hydro-pump 182. The channel 61 ends in a blind pocket shortly before the free end of the driven shaft 59, but has a radial connection to a space 65 which is connected with the area of the clutch housing 9 radially outside of the turbine hub 53 via a passage 71 formed in the turbine hub 53 and leading radially outward. The other channel 63 completely penetrates the driven shaft 59 and opens into an axially adjoining space 73 which continues radially outward via channels 83. These channels 83 are formed in the following manner:

Radial indentations 75 are arranged at the bearing journal 25 and form contact faces for an annular sealing plate 77. The radial indentations are preferably equidistant from one another in the circumferential direction. This sealing plate 77 limits the cross section of radially outwardly extending channels 83 which are formed between every two radial indentations 75. The channels 83 contact axially at axial indentations 81 of the primary flange 21. One of the channels 83 also extends in each instance between two of the axial indentations 81. For this purpose, the sealing plate 77 is connected with the respective indentation 75 or 81, preferably via spot welds 82. While the sealing plate 77 receives, at its radial inner end, a bearing 79 for the free end of the driven shaft 59 it carries at its radial outer end a support 85 for a piston 89 of a lockup clutch 93. The support 85 has an opening 87 through which the channels 83 are connected with a chamber 91 provided axially between the primary flange 21 and the piston 89. The side of the support 85 for the piston 89 facing the drive 1 is fixedly connected to the primary flange 21. A spring holder 95 is fastened to the side of the support 85 facing away from the drive 1 by a weld 99. The piston 89 is fastened via tangential leaf springs 97 to the spring holder 95 such that the piston 89 is axially pretensioned by the tangential leaf springs 97. The piston is rotatably and axially movably mounted on the piston holder 85 between the spring holder 95 and the primary flange 21.

A blade 101 having a friction facing 103 is arranged axially between the primary flange 21 and the piston 89. A friction surface 105 is mounted in a radially outer region of the piston 89 for contact with the friction facing 103 fastened to the blade 101. The opposite side of the blade 101 likewise carries a friction facing 102 that is connectable with a friction surface 104 at the primary flange 21. The blade 101 has a toothing 107 in its outer circumferential area that is engageable with a toothing 109 of a blade holder 111 so as to be fixed with respect to rotation relative to it. The blade holder 111 extends radially inward axially between the piston 89 and the turbine wheel 41 and is a drive-side transmission element 113 for the torsional vibration damper 129. The blade holder 111 has an axial portion 120 on the radial inside of the turbine wheel 37 which extends almost up to the axial end of the axial bulge 45. The blade holder 111 then extends radially inward from axial portion 120, thereby forming a first cover plate 117 of the damping device 135 of the torsional vibration damper 129. A second cover plate 119 is fastened to the blade holder 111 radially outside of the axial portion 120 by a fastening device 115 such. for example, as a rivet, and extends substantially radially inwardly.

A radially inner end 21 of the second cover plate 119 engages axially between a radial projection 123 of the turbine hub 53 and a hub disk 125 of the torsional vibration damper 129. The hub disk 125, together with the turbine hub 53, acts as a driven-side transmission element 141. The radial inner end of the radial lengthening 47 contacts the opposite side of the hub disk 125, wherein the turbine hub 53, the hub disk 125 and the radial lengthening 47 are held in axial contact with one another by a rivet connection 51. The radial inner end 121 of the second cover plate 119 is freely rotatable, but is axially secured between the radial projection 123 of the turbine huh 53 and the hub disk 125.

Elastic elements 134 of the damping device 135 are almost completely enclosed by the first and second cover plates 117 and 119. Both the first and second cover plates 117, 119 have, on the sides facing one another, axial projections 136 which form drive-side driving means 138 for one end of each of the elastic elements 134. The elastic elements 134, which will be further discussed hereinafter, are essentially circumferentially extending springs. The other ends of the elastic elements 134 are supported at a finger-shaped radial projection 132 of the hub disk 125. The hub disk 125 accordingly acts as driven-side driving means 127 for the damping device 135.

Figure 4:
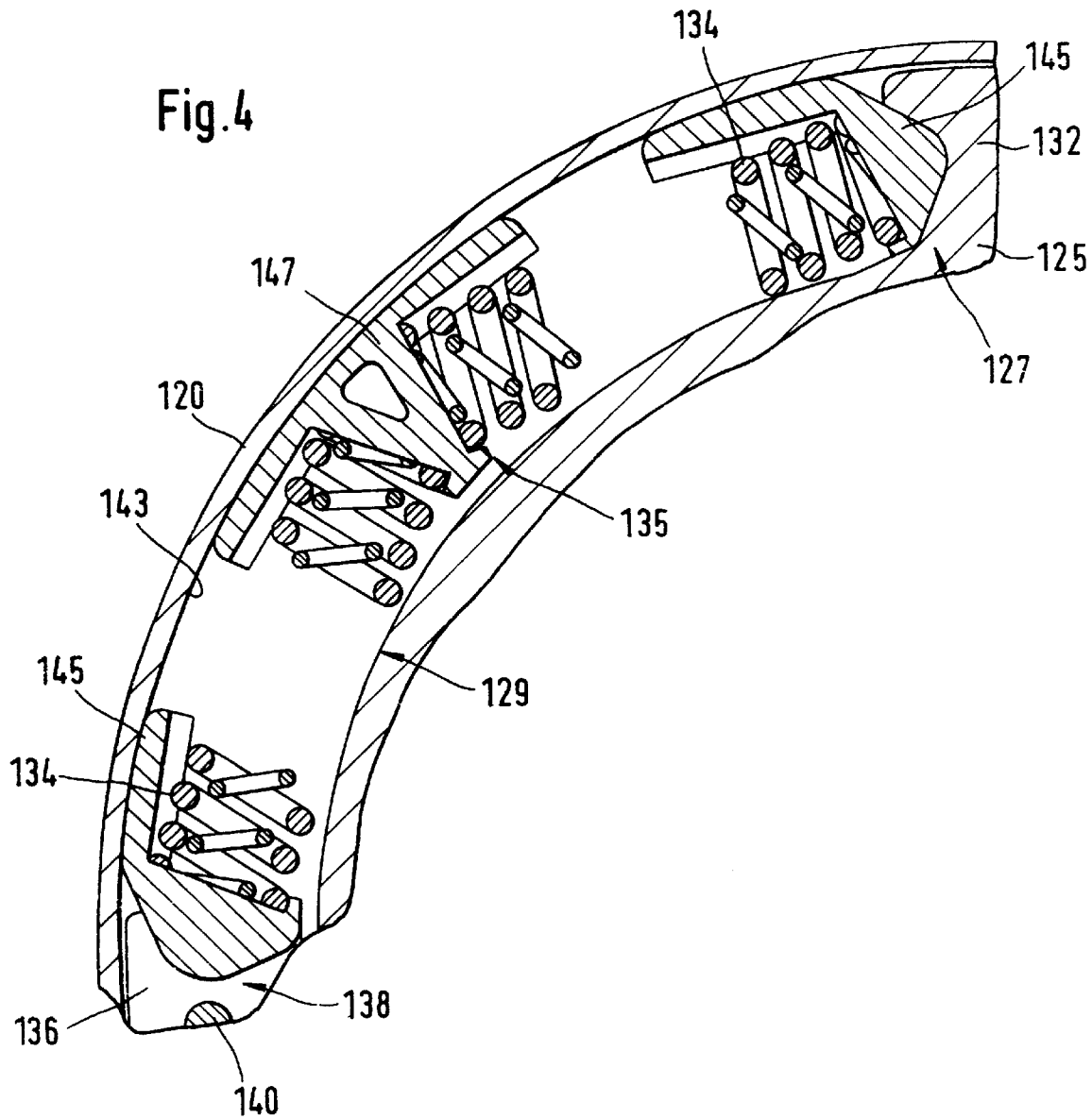
FIG. 4 shows a detail of elastic elements of the damping device with spring cups and sliding shoes along section line IV—IV in FIG. 1.
Figure 5:
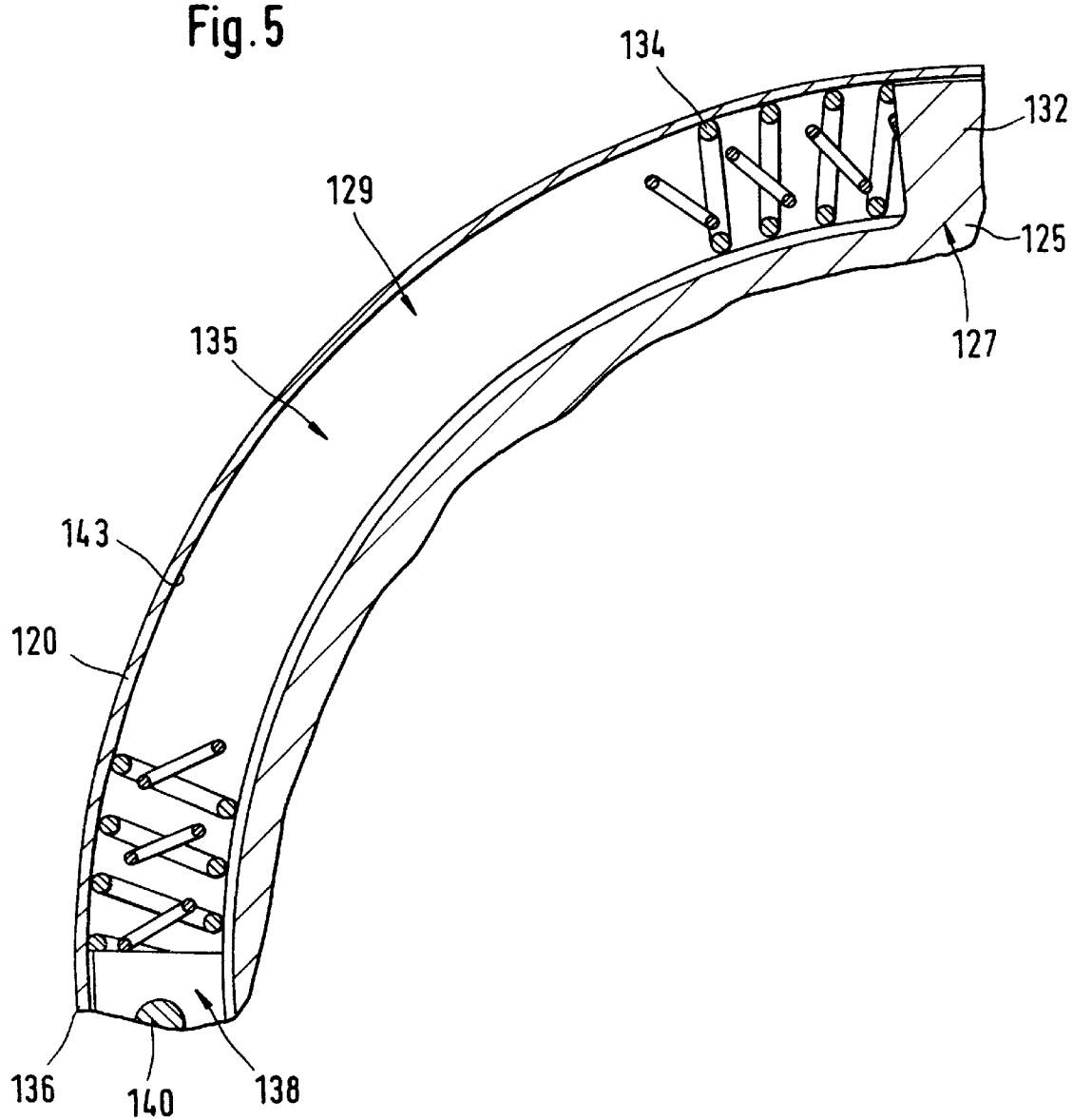
FIG. 5 shows a view of the elastic elements corresponding to FIG. 4 but with pre-curved elastic elements.

A more detailed description of the construction of the damping device 135 will now be presented with reference to FIGS. 4 and 5. According to the embodiment shown in FIG. 4, the axial portion 120 of the first cover plate 117 forms a guide path 143 for spring cups 145 and sliding shoes 147 which act in the following manner: The drive-side driving means 138 of the damping device 135 conduct a torsional vibration to the spring cup 145 adjoining in the circumferential direction, which spring cup 145 receives at least one of two elastic elements 134, shown in FIG. 4. which are nested radially one inside the other. The elastic elements 134 are supported at the other end at the sliding shoe 147 which has a second contact surface for the next elastic elements 134 which are supported in turn, again at the other end, at another element 145. In this way, elastic elements 134 of different stiffness may be used in a series connection. The last spring cup 145 considered in the working direction is supported at the driven-side driving means 127 of the damping device 135, so that the torsional vibration is transmitted to the turbine hub 53 after damping via the hub disk 125. As an alternative to this solution, pre-curved elastic elements 134 of the damping device 135 may also be used in accordance with FIG. 5. These elastic elements 134 are supported radially directly at the guide path 143 of the axial portion 120 of the first cover plate 117. These elastic elements 134 are acted upon in the same way as described above via the drive-side driving means 138 and the driven-side driving means 127.

The axial projections 136 forming the drive-side driving means 138 are fastened to the cover plates 117, 119 by riveting 140 as shown in FIGS. 1, 4 and 5.

The hydrodynamic coupling device operates such that in one switching position of the valve 180, pressure is applied to the channel 61 of the driven shaft 59 by the hydro-pump 182. In this position, the hydraulic fluid is delivered radially outward via the space 65 and the passage 71 and a side of the piston 89 facing the hydrodynamic circuit 40 is acted upon by overpressure. As a result, the piston 89 moves toward the primary flange 21 and exerts an axial force on the friction facing 103 facing it, so that the blade 101 is clamped between the primary flange 21 and the piston 89 in a frictional engagement. The lockup clutch 93 is then closed so that torque present at the clutch housing 9 is transferred via the lockup clutch 93 and the blade holder 111 to the turbine hub 53 via the damping device 135. To disengage the lockup clutch 93 in particular operating states of the vehicle such, for example, as when starting up, the valve 180 of the hydro-pump 182 is switched so that channel 63 of the driven shaft 59 is now provided with hydraulic fluid. In this position of the valve 180 an overpressure builds up in the space 73 and expands over the channels 83 and the passage 87 into the chamber 91 axially between the piston 89 and the primary flange 21. The piston 89 is then pushed toward the hydrodynamic circuit 40 and releases the blade 101 so that torque can no longer be transmitted through the lockup clutch 93. Rather, this torque is transmitted via the hydrodynamic circuit 40 which is supplied by hydraulic fluid that is pumped into the chamber 91.

Figure 2:
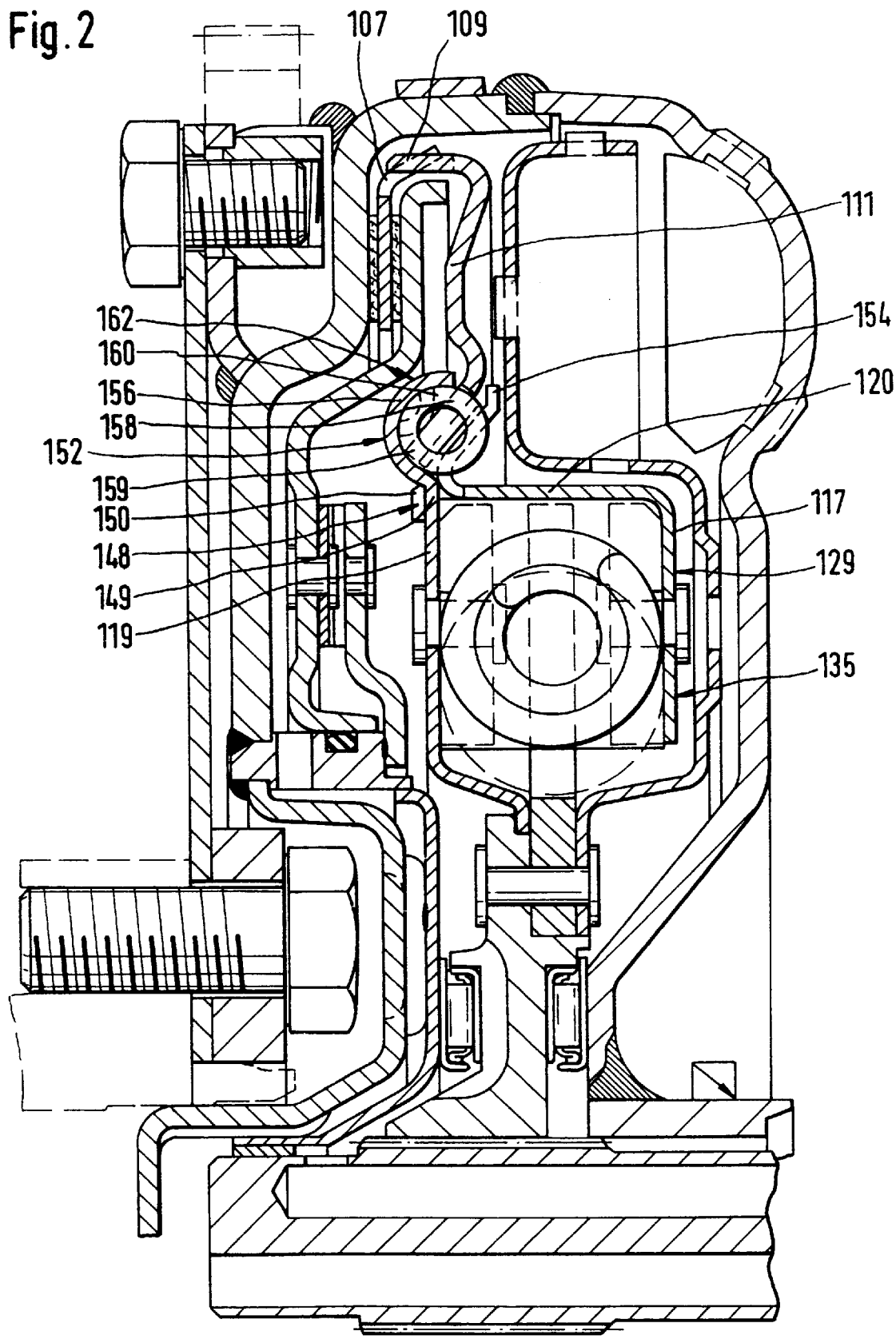
FIG. 2 shows a hydrodynamic coupling device according to another embodiment of the present invention with an additional damping device which is connected forward of the damping device.

FIG. 2 shows a hydrodynamic coupling device in which the torsional vibration damper 129 has an additional damping device 152, in addition to the damping device 135 described above. The additional damping device 152 is located radially outside of the damping device 135. In this embodiment, the fastening 148 of the two cover plates 117, 119 to one another is held different than that shown in FIG. 1. The second cover plate 119 in FIG. 2 has cutouts 149 through which rear engagement means 150 of the first cover plate 117 axially pass. Radially bent ends of the rear engagement means 150 contact the back of the second cover plate 119. Each of the two cover plates 117, 119 has a cover plate lengthening 154, 156 which extends radially outward. These cover plate lenthenings 154, 156 act together as driven-side driving means 162 of the additional damping device 152. Also, this damping device 152 has elastic elements 160 in the form of circumferentially extending springs that are supported by their opposite sides at the radial inner end 159 of the blade holder 111. The radial inner end 159 of the blade holder 111 accordingly acts as drive-side driving means 158 of the additional damping device 152.

The additional damping device 152 is connected in series with damping device 135, so that the elastic elements of the damping device 135 or the elastic elements 160 of the additional damping device 152 are initially deformed in accordance with the stiffness of the respective elastic elements 134, 160. For example, if the elastic elements 160 have a greater stiffness than elastic elements 134, the additional damping device 152 acts as an elastic stop for the torsional vibration damper 129.

Figure 3:
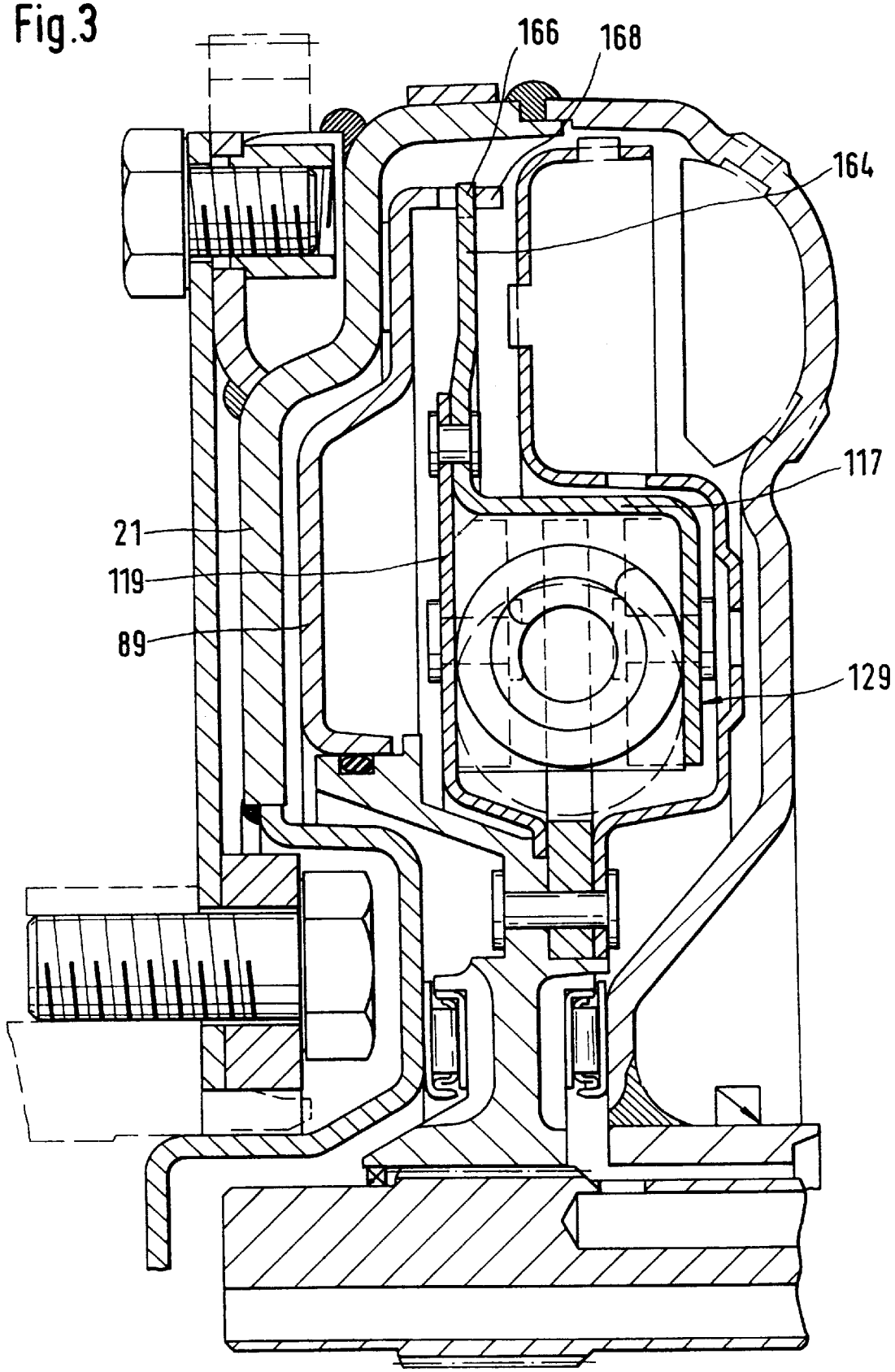
FIG. 3 shows a hydrodynamic coupling device according to another embodiment of the present invention with a piston holder associated with the damping device.

The construction of the embodiment shown in FIG. 3 differs from that shown in FIG. 1 principally by the absence of a blade axially between the piston 89 and the primary flange 21. The portion of the first cover plate 117 extending on the radial outside accordingly acts as a piston holder 164. A toothing 166 on the radially outer side of the first cover plate 117 engages a toothing 168 of the piston 89. In this way, the piston 89 is coupled to the torsional vibration damper 129 so as to he fixed with respect to rotation relative to it.

It is noted, in addition, that the clutch housing 9 of the hydrodynamic coupling device is rotatable about a center axis 170.

Figure 6:
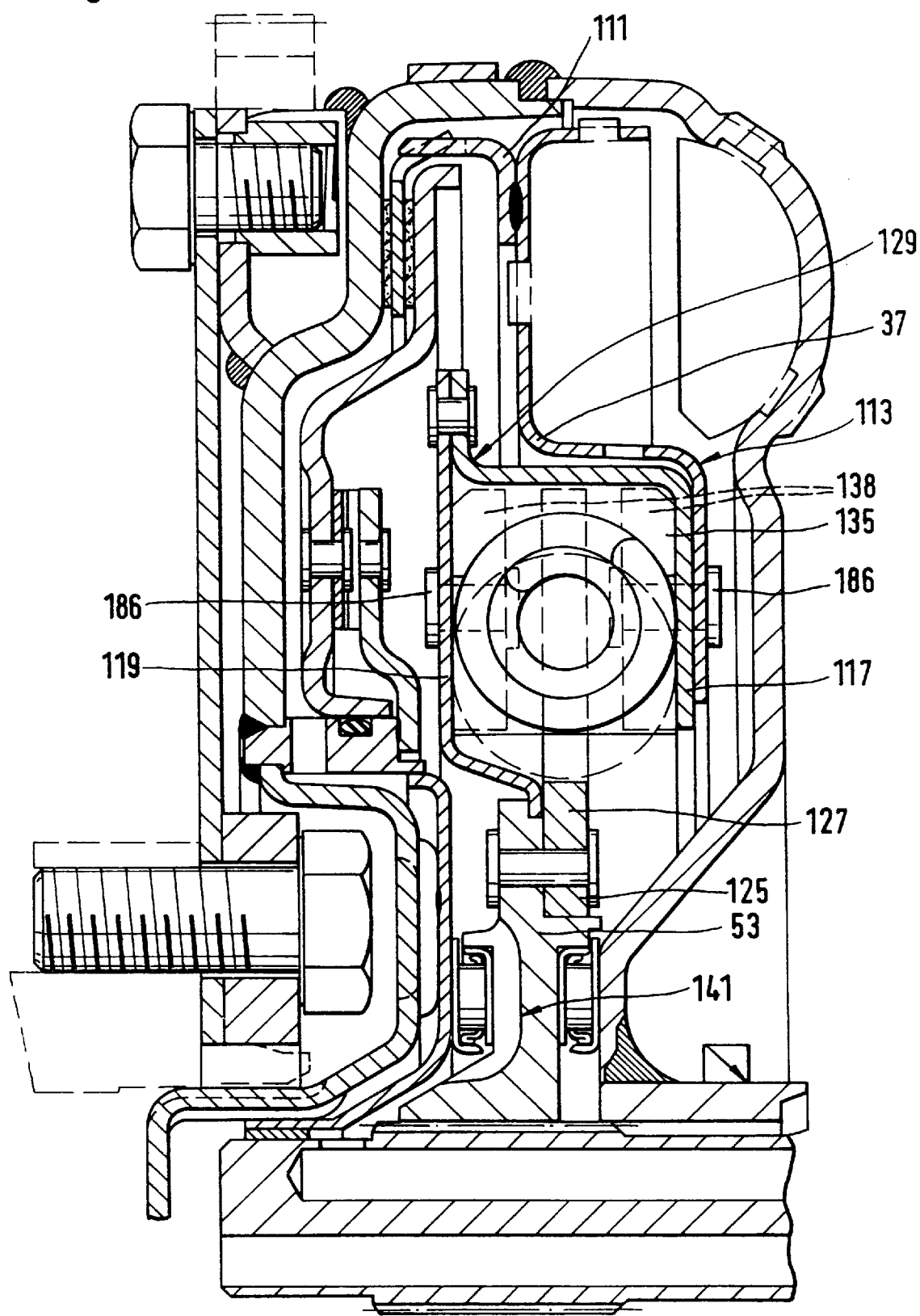
FIG. 6 shows yet another embodiment of a hydrodynamic coupling device according to the invention with an arrangement of the blade holder in front of a turbine shell and of the damping device behind the latter.

FIG. 6 shows all embodiment in which the blade holder 111 is fastened to a radially outer area of the turbine shell 37. The radially inner area of the turbine shell 37 is fastened to the cover plates 117, 119 via a rotational connection 186 by means of rivets and is accordingly fastened to the drive-side driving means 138 of the damping device 135. The hub disk 125, that is, the driven-side driving means 127 of the damping device 135, is fastened to the turbine shell 53 in the manner described above with respect to FIG. 1. Accordingly, the turbine shell 37 forms a drive-side transmission element 113 and the turbine hub 53 forms a driven-side transmission element 141 for the torsional vibration damper 129. This type of arrangement of the torsional vibration damper 129 is known as a "turbine damper".

The invention is not limited by the embodiments described above which are presented as examples only but can be modified in various ways within the scope of protection defined by the appended patent claims.

I claim:

1. A hydrodynamic coupling device, comprising:

an impeller wheel rotatably mounted about an axis of rotation and a turbine wheel rotatably mounted for rotation relative to said impeller wheel about said axis of rotation, said impeller wheel having an impeller shell and an impeller vane arrangement connected with said impeller shell and said turbine wheel having a turbine shell and a turbine vane arrangement in hydrodynamic communication with said impeller vane arrangement and connected to said turbine shell, said impeller vane arrangement and said turbine vane arrangement forming a hydrodynamic circuit;

a lockup clutch including a clutch housing and an axially movable piston, said clutch housing comprising a radially extending primary flange and said impeller shell, a radially outer portion of said primary flange being connected to said impeller shell, and said turbine wheel being arranged axially between said impeller wheel and said primary flange;

said lockup clutch comprising a friction facing operatively arranged axially between said piston and said primary flange for transmitting torque between said piston and primary flange in response to pressure on said piston directed toward said primary flange;

said lockup clutch further comprising a torsional vibration damper including a primary damping device having a drive-side transmission element rotatably mounted for rotation about said axis of rotation, a driven-side transmission element rotatable relative to said drive-side trasmission element, and a circumferentially acting elastic element held elastically between a drive-side driving means on said drive-side transmission element and a driven-side driving means on said driven-side transmission element;

a radial lengthening connected to said turbine shell and extending radially inward to a turbine wheel hub, said radial lengthening having an axial bulge forming an annular space enclosed by said turbine wheel and at least partially enclosed by said impeller wheel, said primary damping device axially penetrating said axial bulge so that said primary damping device is arranged radially inside of said hydrodynamic circuit, and said impeller shell of said clutch housing further comprising an impeller wheel extension radially extending from said impeller wheel to an impeller wheel hub, said axial bulge being operatively arranged for having an axial gap between said axial bulge and said impeller wheel extension, thereby allowing axial movement of said turbine wheel relative to said clutch housing within said gap, without contact between said turbine wheel and said clutch housing.

2. The hydrodynamic coupling device of claim 1, wherein said drive-side element of said primary damping device comprises a first cover plate which substantially follows the axial bulge of said radial lengthening and a second cover plate fixed to said first cover plate with respect to rotation, wherein said first and second cover plates substantially enclose said elastic element.

3. The hydrodynamic coupling device of claim 2, further comprising a blade arranged axially between said primary flange of said clutch housing and said piston and comprising said friction facing, said first cover plate having a blade holder extending radially outward or receiving said blade such that said blade is rotatably fixed and axially movable with respect to said blade holder.

4. The hydrodynamic coupling device of claim 2, further comprising a blade arranged axially between said primary flange of the clutch housing and said piston and comprising said friction facing, wherein said torsional vibration damper comprises a blade holder for receiving said blade such that said blade is fixed with respect to rotation and is axially movable with respect to said blade holder; and said torsional vibration damper further comprising a supplementary damper device having a drive-side driving means and a driven side driving means for holding an elastic element, said drive-side driving means of said supplementary damper device comprising a radially inner end of said blade holder and said driven-side driving means of said supplementary damper device comprising a radially outward lengthening of at least one of said first and second cover plates of said primary damping device.

5. The hydrodynamic coupling device of claim 3, wherein said blade holder comprises a toothing operatively arranged for engaging a toothing on said blade.

6. The hydrodynamic coupling device of claim 4, wherein said blade holder comprises a toothing operatively arranged for engaging a toothing on said blade.

7. The hydrodynamic coupling device of claim 2, wherein said first cover plate comprises a radially outward extending piston holder engagedly receiving said piston at a radially outer portion of said piston holder so that said piston is non-rotatably disposed and axially movable with respect to said piston holder.

8. The hydrodynamic coupling device of claim 7, wherein said radially outer portion of said piston holder comprises a toothing operatively arranged for engaging a toothing of said piston.

9. The hydrodynamic coupling device of claim 2, wherein said first and second cover plates are connected by a fastening.

10. The hydrodynamic coupling device of claim 9, wherein at least one of said first and second cover plates comprises rear engaging means operatively arranged for projecting through and engaging behind associated cutouts in the other of the first and second cover plates.

11. The hydrodynamic coupling device of claim 3, wherein said second cover plate is rotatably mounted and axially secured on said turbine hub.

12. The hydrodynamic coupling device of claim 11, wherein said turbine hub comprises a radial projectional and said second cover plate is axially clamped between said radial projection and said driven-side driving means of said primary damping device.

13. The hydrodynamic coupling device of claim 12, wherein said radial lengthening of said turbine shell is held against a side of said driven-side driving means of said primary damping device remote of the turbine hub.

14. The hydrodynamic coupling device of claim 13, wherein said driven-side driving means of said primary damping device is held between said turbine hub and said radial lengthening of said turbine shell by a riveting.

15. The hydrodynamic coupling device of claim 12, wherein said driven-side driving means of said primary damping device comprises a hub disk having radial projections projecting into an area of extension of the elastic element of said primary damping device.

16. The hydrodynamic coupling device of claim 4, wherein said second cover plate is rotatably mounted and axially secured on said turbine hub.

17. The hydrodynamic coupling device of claim 16, wherein said turbine hub comprises a radial projection and said second cover plate is axially clamped between said radial projection and said driven-side driving means of said primary damping device.

18. The hydrodynamic coupling device of claim 17, wherein said radial lengthening of said turbine shell is held against a side of said driven-side driving means of said primary damping device remote of the turbine hub.

19. The hydrodynamic coupling device of claim 18, wherein said driven-side driving means of said primary damping device is held between said turbine hub and said radial lengthening of said turbine shell by a riveting.

20. The hydrodynamic coupling device of claim 17, wherein said driven-side driving means of said primary damping device comprises a hub disk having radial projections projecting into an area of extension of the elastic element of said primary damping device.

21. The hydrodynamic coupling device of claim 6, wherein said second cover plate is rotatably mounted and axially secured on said turbine hub.

22. The hydrodynamic coupling device of claim 21, wherein said turbine hub comprises a radial projection and said second cover plate is axially clamped between said radial projection and said drive inside driving means of said primary damping device.

23. The hydrodynamic coupling device of claim 22, wherein said radial lengthening of said turbine shell is held against a side of said driven-side driving means of said primary damping device remodel of the turbine hub.

24. The hydrodynamic coupling device of claim 23, wherein said driven-side driving means of said primary damping device is held between said turbine hub and said radial lengthening of said turbine shell by a riveting.

25. The hydrodynamic coupling device of claim 22, wherein said driven-side driving means of said primary damping device comprises a hub disk having radial projections projecting into an area of extension of the elastic element of said primary damping device.

26. The hydrodynamic coupling device of claim 2, wherein said drive-side driving means of said primary damping device comprises axial projections projecting into an area of extension of the elastic clement of the primary damping device, said axial projections being arranged on sides of said first and second cover plates facing one another.

27. The hydrodynamic coupling device of claim 2, wherein said elastic element of said primary damping means comprises a plurality of elastic elements and said primary damping means further comprises spring cups and sliding shoes which receive circumferential ends of said plural elastic elements of said primary damping device, said first cover plate comprising an axial portion having a radially inner end operatively arranged for forming a guide path for said spring cups and said sliding shoes.

28. The hydrodynamic coupling device of claim 27, wherein each said spring cups circumferentially contacts one of said drive-side driving means and said driven-side driving means of said primary damping device and each said sliding shoes is arranged between two circumferentially adjacent ones of said plural elastic elements.

29. The hydrodynamic coupling device of claim 1, wherein said first cover plate comprises an axial portion having a radially inner end operatively arranged for forming a guide path for said elastic element of said primary damping device, wherein the elastic element comprises a pre-curvature corresponding to a radius of said axial portion about said axis of rotation.

30. The hydrodynamic coupling device of claim 1, wherein a radially inner end of said primary flange comprises a curved out portion operatively curved toward said turbine hub, said curved out portion being arranged radially inside of said primary damping device for receiving fastening elements such that said clutch housing is connectable to a drive.

31. The hydrodynamic coupling device of claim 30, wherein said curved out portion comprises axial indentations forming channels, said axial indentations being arranged at predetermined angular intervals along a circumferential direction.

32. The hydrodynamic coupling device of claim 31, further comprising a sealing plate supported by said axial indentations such that said sealing plate limits a cross section of said channels.

33. The hydrodynamic coupling device of claim 32, wherein said sealing plate is connected to said axial indentations by welding.

34. The hydrodynamic coupling, device of claim 32, wherein a radially outer end of said sealing plate comprises a piston support for rotatably and axially movably supporting said piston, said piston support comprising a passage for hydraulic fluid into a chamber axially between said primary flange and said piston.

35. The hydrodynamic coupling device of claims 34, further comprising a driven shaft rotatably connected to said turbine hub, wherein a radially inner end of said curved out portion comprises radial indentations supporting the radially inward continuation of said channels for said sealing plate, and said radially inner end of said sealing plate receiving a bearing in which said driven shalt is held.

36. The hydrodynamic coupling device of claim 1, further comprising a blade arranged axially between said primary flange of said clutch housing and said piston, and a blade holder fixed to said turbine wheel and engaging a radially outer portion of said blade such that said blade is rotatably fixed and axially movable with respect to said blade holder, wherein said drive-side transmission element of said primary damping device comprises said turbine shell and said driven-side transmission element of said primary damping device comprises said turbine hub.

* * * * *